United States Patent [19]
Webber

[11] 3,779,497
[45] Dec. 18, 1973

[54] TRIPOD AND SUPPORT THEREFOR

[76] Inventor: Peter B. Webber, 14 Waverly Rd., Branford, Conn.

[22] Filed: Oct. 15, 1971

[21] Appl. No.: 189,525

[52] U.S. Cl. .............................................. 248/165
[51] Int. Cl. ......................................... F16m 11/22
[58] Field of Search................... 248/163, 165, 151, 248/370; 151/19 R, 38; 287/52.08

[56] References Cited
UNITED STATES PATENTS

| | | | |
|---|---|---|---|
| 1,103,403 | 7/1914 | Duckworth | 287/52.08 |
| 3,323,817 | 6/1967 | Hollyday | 287/52.08 |
| 335,823 | 2/1886 | Linden | 248/165 |
| 807,815 | 12/1905 | Fraser | 248/165 |
| 1,496,465 | 6/1924 | Jackson | 248/165 |
| 3,556,570 | 1/1971 | Cosenza | 151/38 |

FOREIGN PATENTS OR APPLICATIONS

| | | | |
|---|---|---|---|
| 76,725 | 10/1961 | France | 151/19 R |
| 204,125 | 11/1908 | Germany | 248/163 |
| 445,793 | 6/1927 | Germany | 248/165 |
| 156,823 | 8/1965 | Sweden | 248/165 |

Primary Examiner—Marion Parsons, Jr.
Attorney—Delio & Montgomery

[57] ABSTRACT

The legs of a tripod are clamped together by a device which comprises a first member having a generally triangular cavity with corner surfaces formed on a radius larger than the radius of the legs, and a second member of generally triangular shape having corner surfaces recessed on a radius smaller than the radius of the legs. The second member is assembled to the first member such that three-point line contact is made by the two members on each of the legs.

5 Claims, 6 Drawing Figures

PATENTED DEC 18 1973
3,779,497
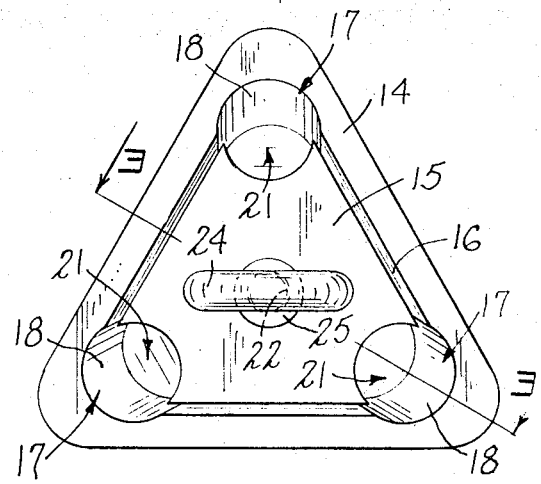
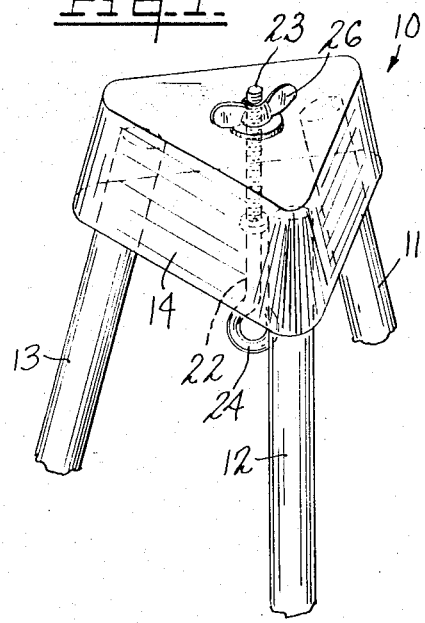
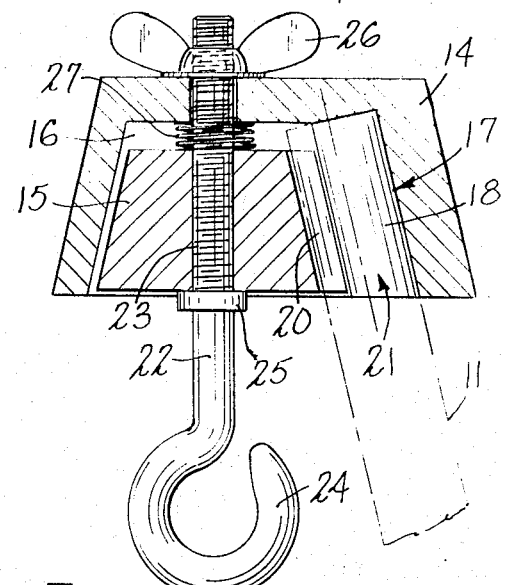
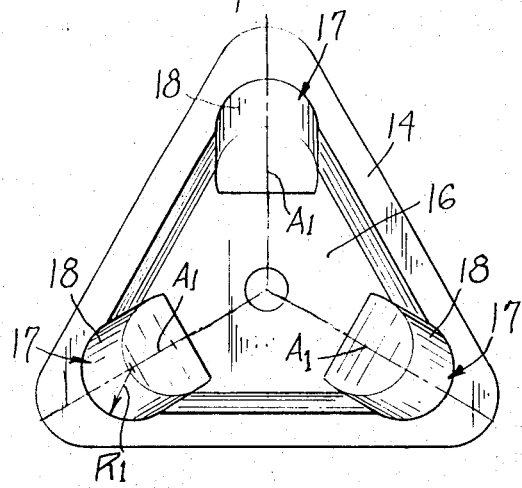
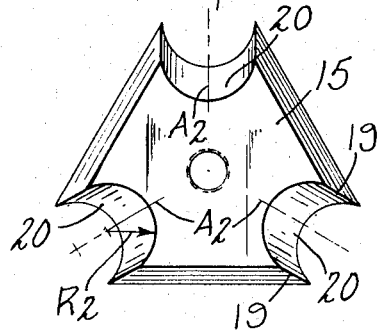
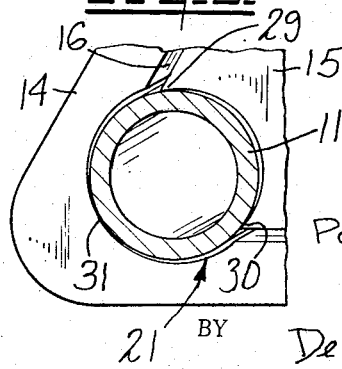
INVENTOR
Peter B. Webber
BY
De Lio and Montgomery
ATTORNEYS

TRIPOD AND SUPPORT THEREFOR

This invention relates to tripods and more particularly relates to a clamping and holding member for a three-legged or tripod type support.

Tripod types of supports are used for various purposes such as camera and tripod mounts, and also for supporting other relatively light-weight objects which must be transported. Such tripods are generally made with folding or telescoping legs for portability and are not of sufficient strength and rigidity for heavier loads.

Accordingly, the present invention is intended to provide a tripod type support which is extremely rigid and stable, capable of relatively large loads, and which may be readily disassembled for transfer or storage.

Briefly stated, the invention in one form thereof comprises a mechanism for rigidly securing the three upper ends of tripod legs and includes a first member having a triangular cavity defined on the under surface thereof where the corners of the cavity are defined on a radius greater than the radius of the legs. These corner portions or recesses may have semi-cylindrical surfaces about an axis which is angled outwardly with respect to the normal position of the clamping member. A second member of generally triangular shape and having cylindrical recesses in the corners thereof of lesser radius than the legs is received within the cavity of the first member and is arranged to be drawn upwardly into such cavity so that the legs of the tripod are received between the two recesses and engaged at three points thereof.

An object of this invention is to provide a new and improved tripod support or joining member.

Another object of this invention is to provide a new and improved tripod support of increased stability and rigidity.

A further object of this invention is to provide a tripod which is simple in construction and may be easily transported and stored.

The features of the invention which are believed to be novel are particularly pointed out and distinctly claimed in the concluding portion of this specification. The invention, however, may best be appreciated by reference to the following detailed description taken in conjunction with the drawings, wherein:

FIG. 1 is a view in perspective of a tripod clamp embodying the invention with the legs therein;

FIG. 2 is a view of the clamping member of FIG. 1 seen from the underside thereof;

FIG. 3 is a view seen in the plane of lines 3—3 of FIG. 2;

FIG. 4 is a view similar to FIG. 2 but with the inner clamping member removed;

FIG. 5 is a view of the inner clamping member removed from the clamp and seen from the upper surface thereof; and FIG. 6 is a view of one corner of the clamping member with a leg received between the two parts thereof.

As exemplified in FIG. 1, a clamp 10 embodying the invention is arranged to rigidly hold three tripod legs 11, 12 and 13 in rigid angular relationship.

The device 10 comprises a first outer member 14 and a second inner member 15. As shown in FIG. 4, outer member 14 has defined therein a generally triangular cavity 16 having corners 17 defined on a radius greater than the radius of any of the legs 11 – 13. This is more clearly exemplified in FIG. 6. Surfaces 18 are partially cylindrical and are defined on a radius $R_1$. Radius $R_1$ extends from an axis $A_1$ which is angled a predetermined amount from the vertical as hereinafter described.

The inner member 15 is of generally triangular shape but the corners thereof are recessed on a radius $R_2$ to provide edges 19 subtending the surfaces 20 which are angled with the vertical substantially the same as surfaces 18 of member 14. Radius $R_2$ extends from an axis $A_2$ which is angled essentially the same amount as axis $A_1$. The terminal edges 29 of surface 20 subtend on an arc of a smaller radius than legs. It is not necessary that the surfaces 20 be defined on a radius so long as the edges are defined on the stated radius. When the inner member 15 is disposed within the cavity 16, the cooperating surfaces 18 and 20 define pockets 21 (FIG. 2) each of which receives one of legs 11, 12 and 13.

The members 14 and 15 are drawn together as by means of a bolt 22 threaded along a shank portion 23 and having a hook or eye 24 adapted to receive a load thereon. The bolt 22 has a collar or washer 25 thereon which engages the under surface or member 15, and also transmits a lifting or clamping force to member 15. The shank end of bolt 22 receives a nut, exemplified as a wing nut 26 thereon. Disposed about the shank of bolt 22 between the members 14 and 15 is a release spring 27.

To effect the assembly of FIG. 1, the ends of the legs 11, 12 and 13 are disposed in the pockets 21. Then, as wing nut 26 is turned, the bolt 22 will be pulled upwardly together with member 15 thereon which cannot rotate. As a result, member 15 will have linear motion moving upwardly with respect to memeber 14 and the terminal edges 19 of surfaces 20 defined by radius $R_2$ will engage the legs 11, 12 or 13 at two spaced-apart points in line contact as exemplified in FIG. 6, along points 29 and 30. This will urge the other side of the periphery of the legs into engagement with surface 18 as exemplified at 31 in FIG. 6. When wing nut 26 has been turned to effect the desired clamping effect, each of the legs will be engaged in line contact at three points 29, 30 and 31 substantially 120 degrees apart. In any event, there will be a three-point line contact of the members 14 and 15 on each of the legs. This will rigidly clamp the legs to the assembly 10.

While the above-described clamping operation is accomplished, spring 27 will be compressed and have energy stored therein. When it is desired to disassemble the tripod, the wing nut 26 is loosened and the energy stored in spring 27 will urge member 15 downwardly to aid in rapid disengagement. Then the clamping member together with the three rods may be easily transported or stored in a disassembled condition.

The axes $A_1$ and $A_2$ of each pocket 21 are preferably 120 degrees apart as seen in the horizontal plane. The angle of these axes with the vertical may very over a range dependent on the amount of space to be enclosed by the legs, the load to be supported, etc.

It will be understood that the fastening arrangement disclosed may be reversed or otherwise modified. For example, in place of the hook or eye 24 another type of holding means or perhaps a fastening adaptor could be utilized, the position of the bolt 22 reversed and the wing nut actuated from beneath member 15.

It may thus be seen that the objects of the invention set forth as well as those made apparent are efficiently attained. While preferred embodiments of the invention have been set forth for purposes of disclosure, other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

What is claimed is:

1. A device for clamping and holding in fixed relation three cylindrical legs to form a tripod, comprising a first member, said first member defining a generally triangular cavity, the three corners of said cavity having surfaces defined on a radius greater than the radius of the legs, a second member of generally triangular shape arranged to be received in the cavity, said second member having recesses defined in the corners thereof which define two edges subtending an arc on a smaller radius than the radius of the legs, and coupling means for drawing said second member within said cavity so that legs positioned within said corners are engaged by said edges on said second member and are urged against the walls of said corners.

2. The device of claim 1 wherein said coupling means comprises a threaded bolt extending through said first and second members and spring means disposed about said bolt between said first and second means.

3. The device of claim 1 further including resilient means arranged between said first and second members to be compressed and store energy therein when said first and second members are coupled to clamp the legs therein.

4. The device of claim 1 wherein said surfaces of said first member and said corresponding edges of said second member are essentially parallel.

5. The device of claim 4 wherein each pair of said edges and the corresponding corner surfaces define leg-receiving pockets, each of said pockets adapted to receive a leg at a predetermined angle to the vertical.

* * * * *